(12) United States Patent
Cacharelis

(10) Patent No.: US 6,437,839 B1
(45) Date of Patent: Aug. 20, 2002

(54) LIQUID CRYSTAL ON SILICON (LCOS) DISPLAY PIXEL WITH MULTIPLE STORAGE CAPACITORS

(75) Inventor: Philip John Cacharelis, Menlo Park, CA (US)

(73) Assignee: National Semiconductor Company, Santa Clara, CA (US)

( * ) Notice: Subject to any disclaimer, the term of this patent is extended or adjusted under 35 U.S.C. 154(b) by 0 days.

(21) Appl. No.: 09/298,412

(22) Filed: Apr. 23, 1999

(51) Int. Cl.[7] .................... G02F 1/1343; G02F 1/136
(52) U.S. Cl. ............................ 349/39; 349/42
(58) Field of Search ..................... 349/43, 39, 38, 349/42, 47, 48

(56) References Cited

U.S. PATENT DOCUMENTS

| | | | |
|---|---|---|---|
| 3,862,360 A | 1/1975 | Dill et al. ............... | 178/7.3 D |
| 5,182,620 A | * 1/1993 | Shimada et al. ........... | 349/39 |
| 5,194,974 A | * 3/1993 | Hamada et al. ........... | 349/144 |
| 5,247,289 A | 9/1993 | Matsueda ................ | 345/98 |
| 5,461,501 A | * 10/1995 | Sato et al. .............. | 349/39 |
| 5,550,072 A | 8/1996 | Cacharelis et al. ........ | 437/43 |
| 5,764,324 A | 6/1998 | Lu et al. ................ | 349/113 |
| 5,926,160 A | * 7/1999 | Furuya ................. | 345/98 |
| 5,977,940 A | * 11/1999 | Akiyama et al. .......... | 345/94 |
| 6,215,534 B1 | * 4/2001 | Raj et al. ............... | 349/84 |

OTHER PUBLICATIONS

Cacharelis, Philip et al., "A Reflective–mode PDLC Light Valve Display Technology", Proceedings of the 27th European Solid–State Device Research Conference, 1997, pp. 596–599.

* cited by examiner

Primary Examiner—Kenneth Parker
(74) Attorney, Agent, or Firm—Wildman Harrold Allen & Dixon

(57) ABSTRACT

A liquid crystal on silicon (LCOS) display pixel with dual storage capacitors for increasing the storage capacitance of the charge storage node for the liquid crystal pixel. The two capacitors are in a stacked arrangement. The bottom capacitor is formed by using a buried diffusion layer as the bottom electrode, a first layer of polysilicon (poly) as the top electrode and silicon dioxide as the dielectric. The top capacitor is a poly-to-poly capacitor formed by using the first layer of poly as the bottom electrode and a second layer of poly as the top electrode.

22 Claims, 7 Drawing Sheets

US 6,437,839 B1

LIQUID CRYSTAL ON SILICON (LCOS) DISPLAY PIXEL WITH MULTIPLE STORAGE CAPACITORS

BACKGROUND OF THE INVENTION

1. Field of the Invention

The present invention relates to light valves used in display devices, and in particular, to integrated circuits using liquid crystal on silicon (LCOS) for creating LCOS display pixels forming high resolution light valves.

2. Description of the Related Art

Liquid crystal displays (LCDs) are becoming increasingly prevalent in high-density projection display devices. These conventional high density projection-type color display devices typically include a light source which emits white light. Dichroic mirrors separate the white light into its corresponding red, green and blue (RGB) bands of light. Each of these colored bands of light is then directed toward a corresponding liquid crystal light valve which, depending upon the image to be projected, either permits or prevents light transmission. Those RGB bands of light which are permitted to be transmitted through the light valves are then combined by dichroic mirrors or a prism. A projection lens then magnifies and projects the image onto a projection screen (Examples of circuit designs and fabrication techniques involving liquid crystal pixel circuits can be found in U.S. Pat. Nos. 5,247,289, 5,461,501 and 5,550,072, the disclosures of which are incorporated herein by reference.)

FIG. 1 illustrates a conventional LCD projection-type imaging system 100. Imaging system 100 includes a light source 101. White light is emitted from light source 101. Once the light hits the prism 103, the light is separated into its red, green and blue colored bands of light by dichroic filter coatings. Colored light is directed toward LCD light valves 105. When reflected off light valve 105, the colored light waves travel back through the prism and through projection lens 107. Lens 107 magnifies and projects the synthesized color image onto projection screen 109.

Conventional LCD light valves are formed by confining a thin layer of liquid crystal material between a top plate and a bottom plate. The top plate is a translucent substrate (typically glass) having one large electrode on a surface adjacent to the liquid crystal material. The bottom plate is generally interconnect overlying a storage capacitor structure formed within a silicon substrate.

FIG. 2 illustrates a cross-sectional view of adjacent pixel cell structures lacking a light absorbing layer, that form a portion of a conventional light valve. Portion 200 of the conventional light valve includes a glass top plate 202 bonded to a interconnect 204 by a sealing member (not shown). The sealing member serves to enclose a display area and to separate glass plate 202 from interconnect 204 by a predetermined minute distance. Thus, the light valve has an inner cavity 206 defined by the glass plate 202 and interconnect 204. Liquid crystal material 211, such as polymer dispersed liquid crystal (PDLC), is sealed in inner cavity 206.

Portion 200 of the conventional light valve depicted in FIG. 2 shows adjacent pixel cells 210a and 210b having reflective pixel electrodes 212a and 212b, respectively. Reflective pixel electrodes 212a and 212b are formed as part of third metalization layer 214 of interconnect 204. The surfaces of adjacent pixel electrodes 212a and 212b are covered with a reflecting layer 216. Reflecting layer 216 serves to reflect away white light incident to the pixel cell as described above in connection with FIG. 1. Adjacent pixel electrodes 212a and 212b are electrically coupled to respective storage capacitor structures 218a and 218b formed in underlying silicon substrate 205.

During operation of pixel cells 210a and 210b, driving circuits (not shown) are electrically coupled with storage capacitors 218a and 218b through row select lines 220a and 220b formed as part of first metalization layer 222 of interconnect 204. Storage capacitors 218a and 218b in turn transmit voltages to pixel cell electrodes 212a and 212b through portions of first, second, and third metalization layers 222, 224, and 214 of interconnect 204.

First metalization layer 222 is electronically isolated from silicon substrate 205 by first intermetal dielectric layer 226. Second metalization layer 224 is electronically isolated from first metalization layer 222 by second intermetal dielectric layer 225. Third metalization layer 214 is electronically isolated from second metalization layer 224 by third intermetal dielectric layer 228.

The selective application of voltage to pixel electrodes 212a and 212b switches pixel cells 210a and 210b of light valve 200 on and off. Specifically, a voltage applied to a pixel electrode varies the direction of orientation of the liquid crystal material on the pixel electrode. A change in the direction of orientation of the liquid crystal material at the pixel electrode changes the optical characteristics of the light traveling through the liquid crystal. If the light valve contains twisted nematic crystal, light passes through the light valve unchanged where no voltage is applied to the pixel electrode, and the light is polarized if a voltage is applied to the pixel electrode. If the light valve contains PDLC, light passes through the light valve unchanged where a voltage is applied to the pixel electrode, and light is scattered if no voltage is applied to the pixel electrode.

However, as the densities of such displays have increased, limitations have been encountered. For example, one limitation on this density is the need for a minimum amount of storage capacitance in each pixel. For example, depending upon the frame rate of the display, the decay of the charge on the storage capacitor can lead to instability of the level of grey scale illumination, thereby leading to degradation in the image quality.

Accordingly, it would be desirable to have a technique for increasing individual pixel storage capacitance while maintaining the desired pixel density within the pixel array.

SUMMARY OF THE INVENTION

A liquid crystal pixel circuit in accordance with the present invention provides increased storage capacitance by using multiple storage capacitors with minimal, if any, increase in required circuit area. According to one embodiment, two storage capacitors are integrated in a vertical, or stacked, configuration in which a common, or shared, electrode is used for both capacitors.

In accordance with one embodiment of the present invention, an integrated liquid crystal pixel circuit with a plurality of storage capacitors includes an integrated circuit which includes a semiconductor substrate, a charge terminal, a reference terminal, a pass transistor, a liquid crystal cell and a plurality of storage capacitors. The charge terminal is within the integrated circuit and configured to receive and convey an electrical charge. The reference terminal is within the integrated circuit and configured to receive and convey a reference voltage. The pass transistor is within the integrated circuit, coupled to the charge terminal and configured to receive a control signal and in accordance therewith conduct the electrical charge. The liquid crystal cell is atop the integrated circuit, coupled to the pass transistor and responsive to the electrical charge. The plurality of storage capacitors is within the integrated circuit, coupled in parallel between the pass transistor and the reference terminal and configured to receive and store the electrical charge.

In accordance with another embodiment of the present invention, an integrated liquid crystal pixel circuit with a plurality of storage capacitors includes an integrated circuit which includes a semiconductor substrate, a charge terminal, a reference terminal, a transistor, a liquid crystal cell and first and second capacitors. The charge terminal is within the integrated circuit and configured to receive and convey an electrical charge. The reference terminal is within the integrated circuit and configured to receive and convey a reference voltage. The transistor is within the integrated circuit, coupled to the charge terminal and configured to receive a control signal and in accordance therewith conduct the electrical charge. The liquid crystal cell is atop the integrated circuit, coupled to the pass transistor and responsive to the electrical charge. The first capacitor is within the integrated circuit, coupled between the pass transistor and the reference terminal and configured to receive and store a portion of the electrical charge. This capacitor includes a first electrode, a shared electrode and a first dielectric material between the first and shared electrodes. The second capacitor is within the integrated circuit, coupled between the pass transistor and the reference terminal and configured to receive and store another portion of the electrical charge. This capacitor includes the shared electrode, a second electrode and a second dielectric material between the second and shared electrodes.

In accordance with still another embodiment of the present invention, a method of fabricating an integrated liquid crystal pixel circuit with a plurality of storage capacitors includes the steps of:

providing a semiconductor substrate with an upper surface;

forming a transistor within the semiconductor substrate;

forming an isolated doped region within the semiconductor substrate below the upper surface;

forming a first conductive layer over the upper surface, wherein the first conductive layer is insulated from the isolated doped region;

forming a first insulating layer over the first conductive layer;

forming a second conductive layer over the first insulating layer, wherein the second conductive layer is insulated from the first conductive layer;

forming a second insulating layer over the second conductive layer;

forming a third conductive layer over the second insulating layer, wherein the third conductive layer is insulated from the second conductive layer;

forming a conduction path between the isolated doped region and the second conductive layer, wherein
the mutually insulated isolated doped region and first conductive layer together form a first capacitor,
the first conductive layer, the first insulating layer and the second conductive layer together form a second capacitor, and
the conduction path causes the first and second capacitors to be coupled in parallel;

forming a liquid crystal cell; and conductively coupling the liquid crystal cell, the transistor and the first and second capacitors.

These and other features and advantages of the present invention will be understood upon consideration of the following detailed description of the invention and the accompanying drawings.

DETAILED DESCRIPTION OF THE INVENTION

Figure 1:
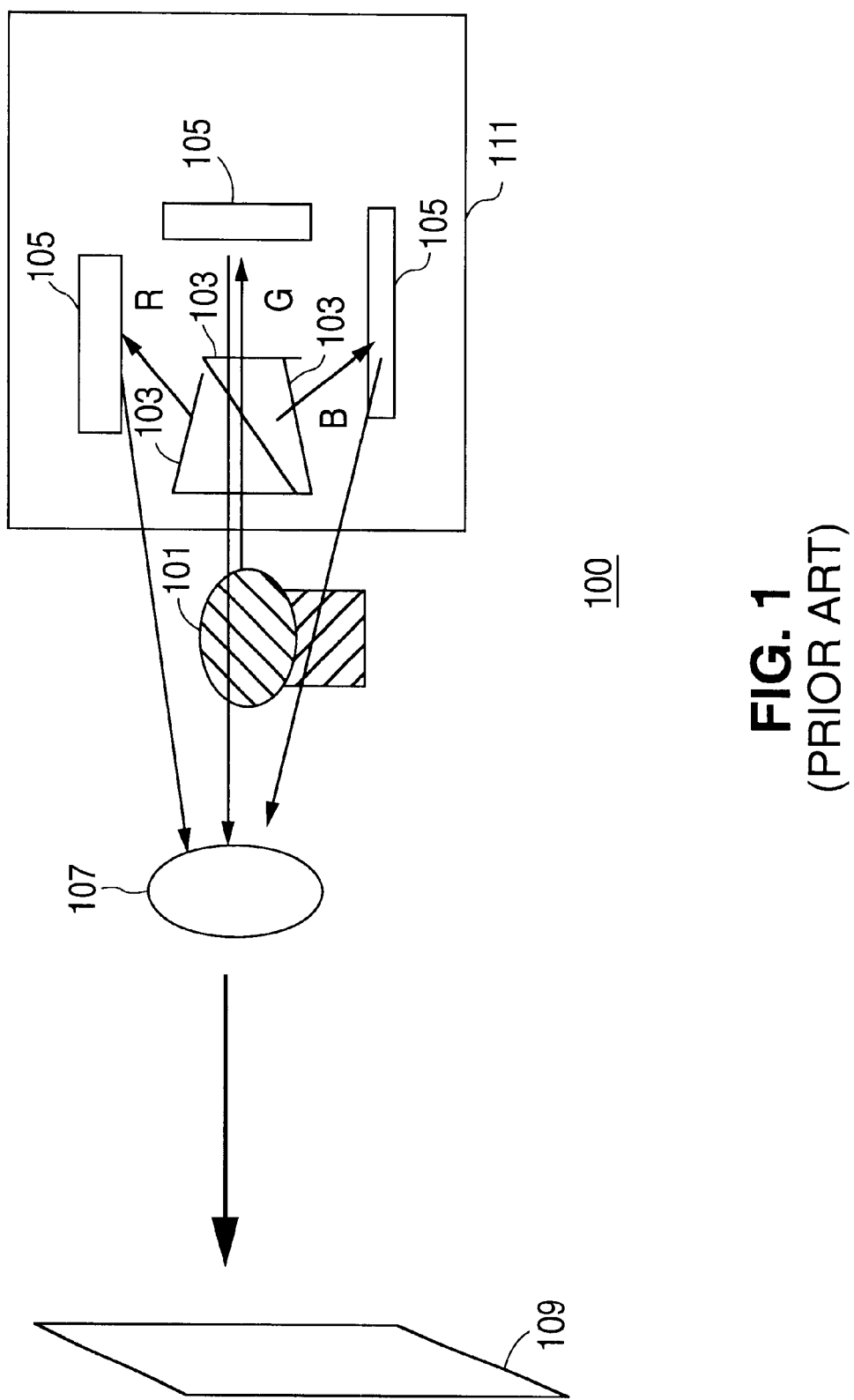
FIG. 1 illustrates a conventional LCD projection system.
Figure 2:
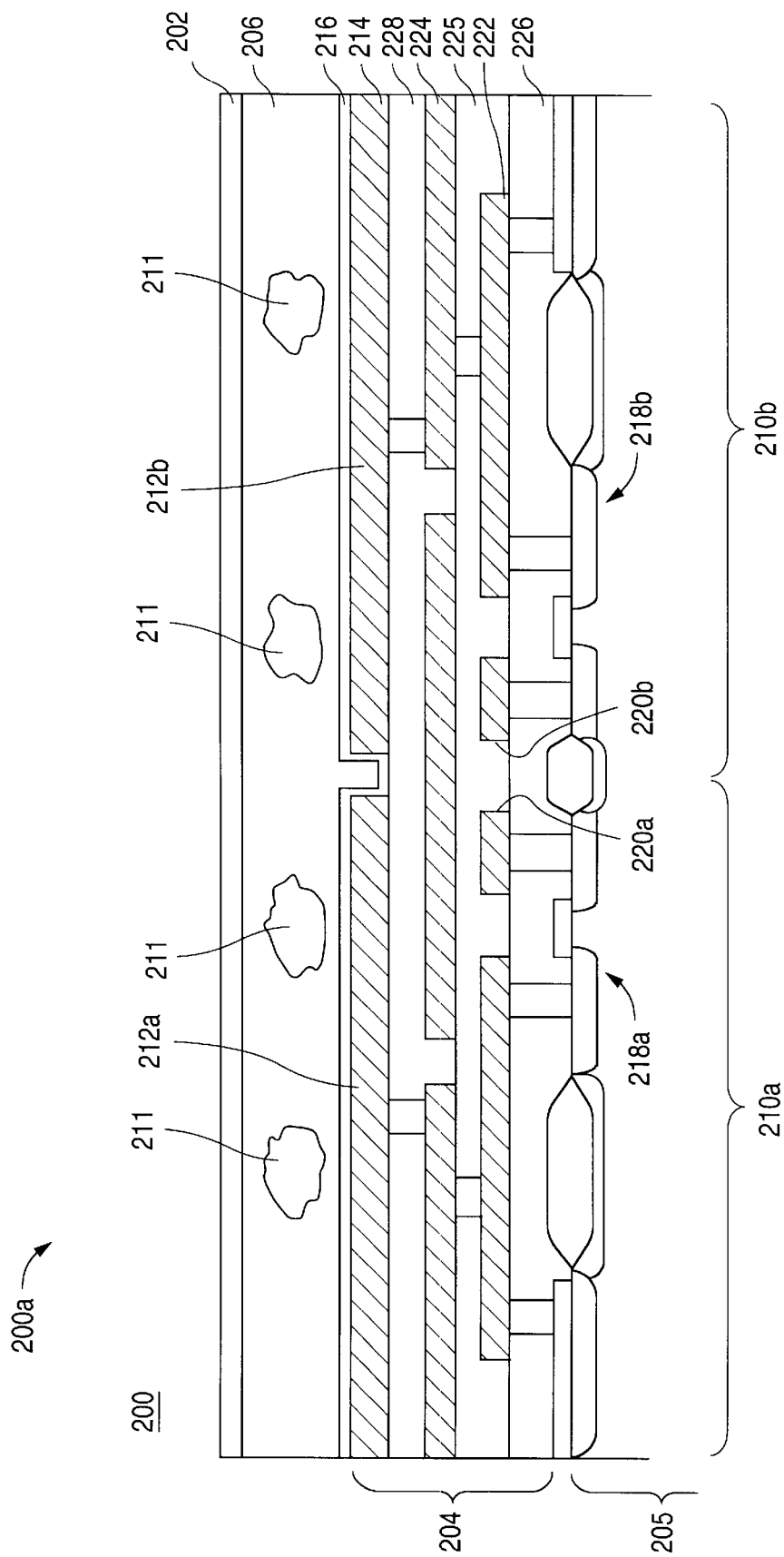
FIG. 2 illustrates a cross-sectional view of adjacent pixel cell structures that form a portion of a conventional light valve.
Figure 3A:
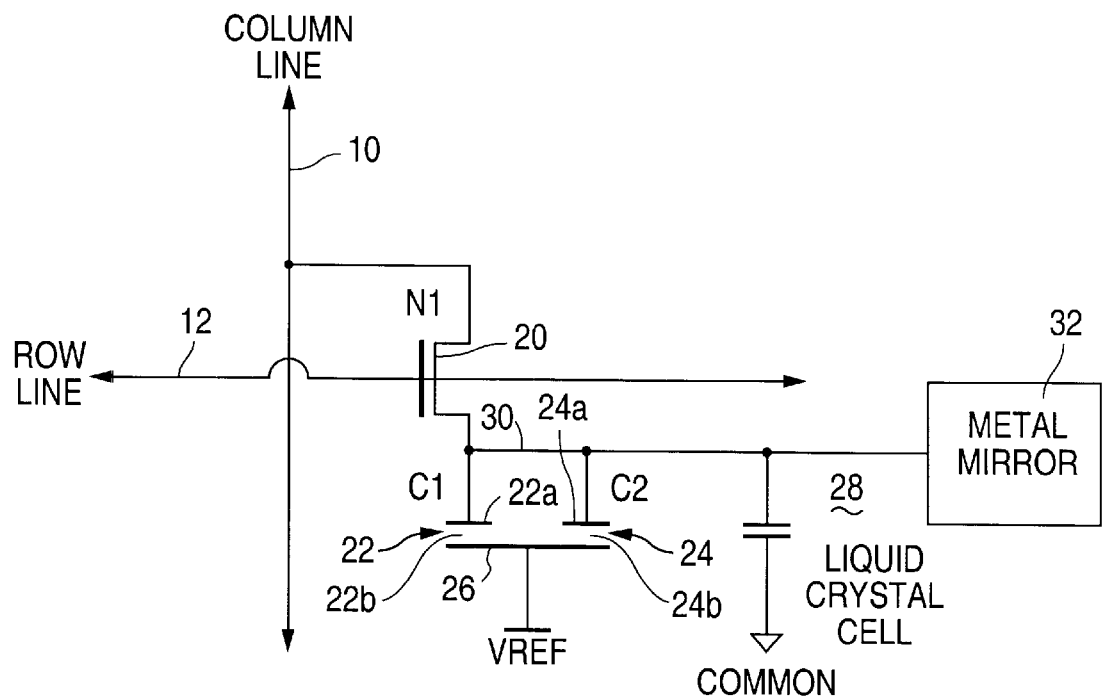
FIG. 3A is a schematic diagram of an individual integrated liquid crystal pixel circuit in accordance with one embodiment of the present invention.

Referring to FIG. 3A, an integrated liquid crystal pixel circuit with multiple storage capacitors in accordance with one embodiment of the present invention includes a pass transistor 20 and two capacitors 22, 24 which share a common electrode 26, along with an associated liquid crystal cell 28. The drain terminal of the N-type metal oxide semiconductor field affect transistor (N-MOSFET) 20 is connected to the column line 10 while the gate terminal is connected to the row line 12. As is well known in the art, the row line 12 provides a control signal to the transistor 20 for purposes of transferring electrical charge appearing at the column line 10 to the storage capacitors 22, 24 for storage therein. Such electrical charge corresponds to the image information associated with that pixel and the liquid crystal cell 28, in response to such electrical charge, displays or projects the appropriate pixel information.

Figure 3B:
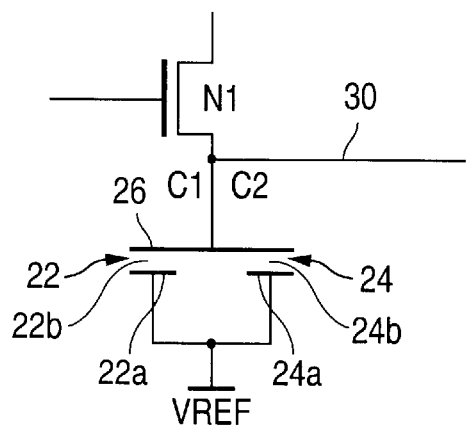
FIG. 3B is a schematic diagram of an alternative structure for the storage capacitor in the circuit of FIG. 3A.
Figure 4:
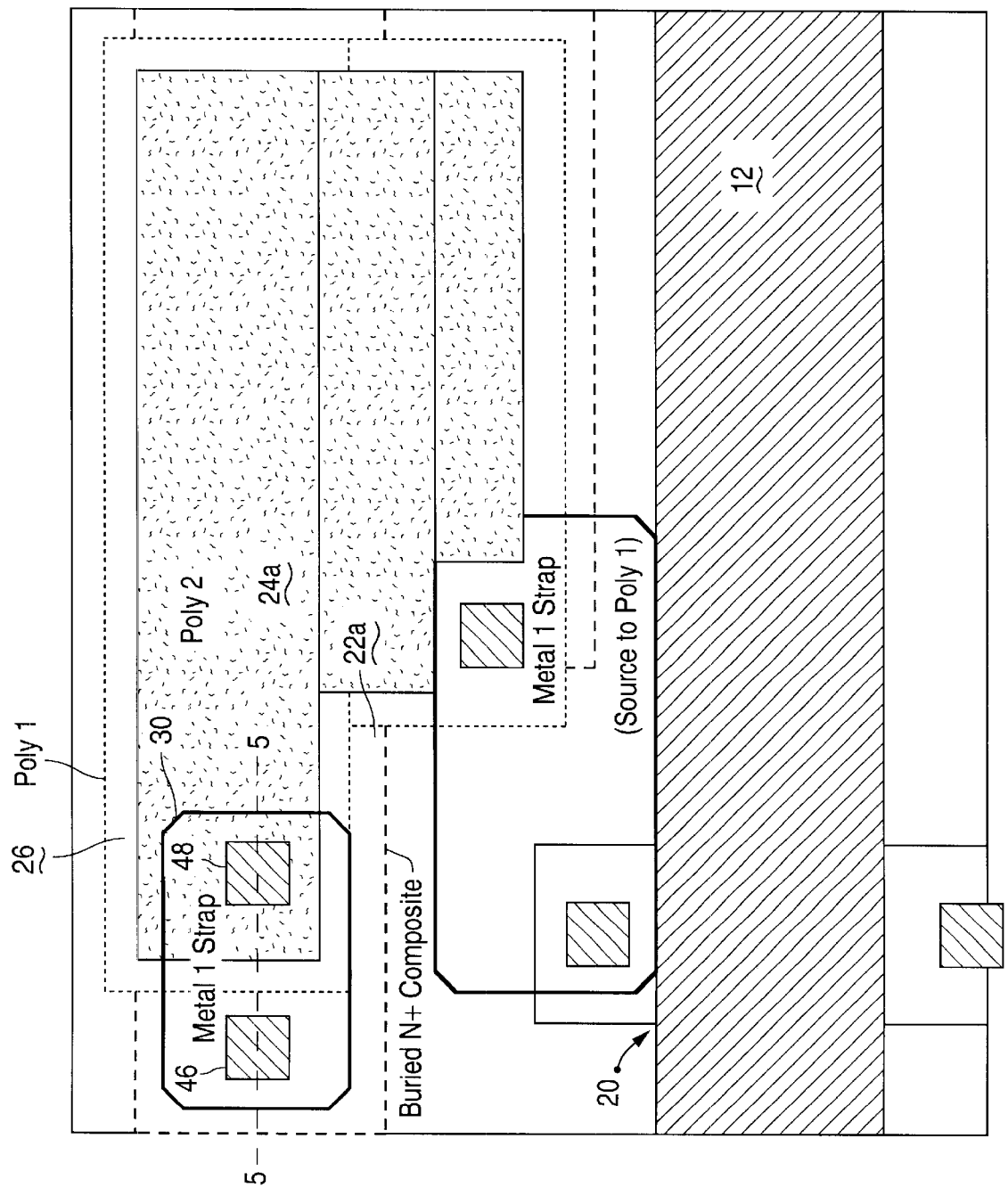
FIG. 4 is a plan view of an example of a layout for that portion of an integrated circuit containing the circuit of FIG. 3A.

As represented in FIG. 3A, the storage capacitors 22, 24 share a common "bottom" electrode 26 while having individual respective "top" electrodes 22a, 24a and dielectric regions 220b, 24b. The "top" electrodes 22a, 24a are connected to the source terminal of the pass transistor 20 for receiving the electrical charge, while the common "bottom" electrode 26 is connected to a reference node which receives a reference voltage VREF (e.g., the power supply voltage VDD). It should be understood that the terms "top" and "bottom" as used herein merely refer to the relative locations of the capacitor electrodes as depicted in the electrical circuit diagram, and that such terms are not to be interpreted in any limiting manner with respect to the actual integrated circuit structure used to implement the storage capacitors 22, 24. For example, as shown in FIG. 3B, an alternative embodiment can have the common electrode 26 on top and the interconnected electrodes 22a, 24a on the bottom.

Figure 5A:
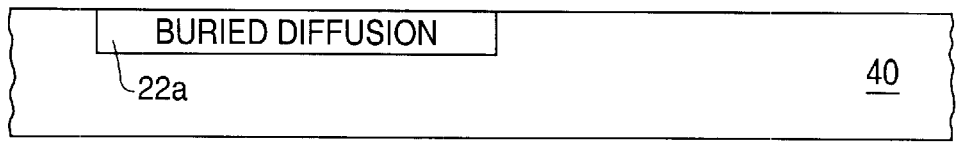
FIGS. 5A–5H are cross-sectional views for illustrating the fabrication steps of the integrated circuit of FIG. 4 taken along line 5—5 (with FIGS. 5G and 5H illustrating examples of the final integrated capacitor structures corresponding to the electrical capacitor structures of FIGS. 3A and 3B, respectively).
Figure 5B:
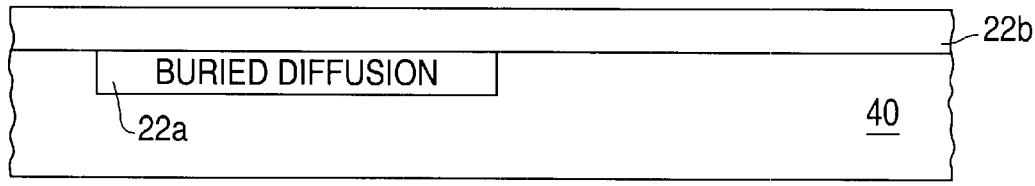
Figure 5C:
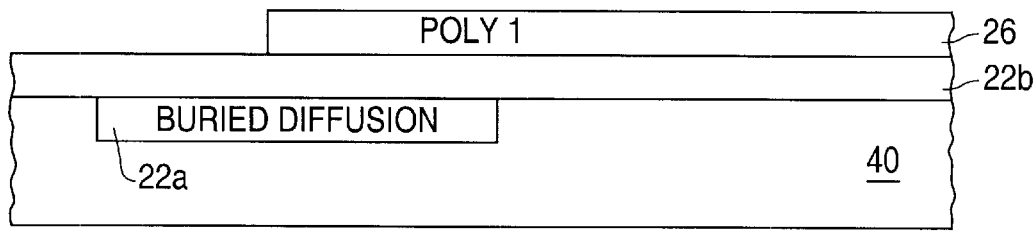
Figure 5D:
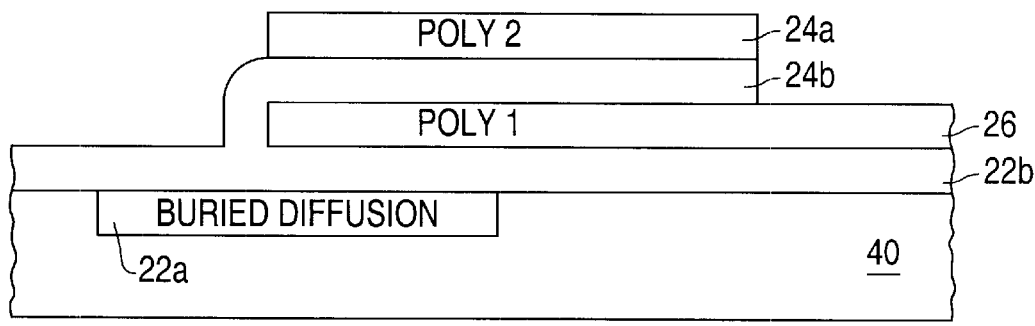

Referring to FIGS. 4 and 5A–5G together, the fabrication and structure of the capacitors 22, 24, in conjunction with the remaining circuitry, can perhaps be better understood. Within the substrate (or, alternatively, a doped well within the substrate) 40 of the integrated circuit, a diffusion region is created (FIG. 5A). This diffusion region forms "top" electrode 22a of the first capacitor 22. Following that, a gate oxide region is formed above the diffusion region (FIG. 5B). This layer of oxide material forms the dielectric 22b of the first capacitor 22. Following that, a first layer of polysilicon ("poly 1") is formed (FIG. 5C). This forms the common "bottom" electrode 26 of both capacitors 22, 24. Further oxide material, e.g., silicon dioxide, is then formed over this poly 1 layer. This added layer of insulating material forms the dielectric 24b of the second capacitor 24. Following that, a second layer of poly (poly 2) is formed to create the "top" electrode 24a of the second capacitor 24 (FIG. 5D).

Figure 5E:
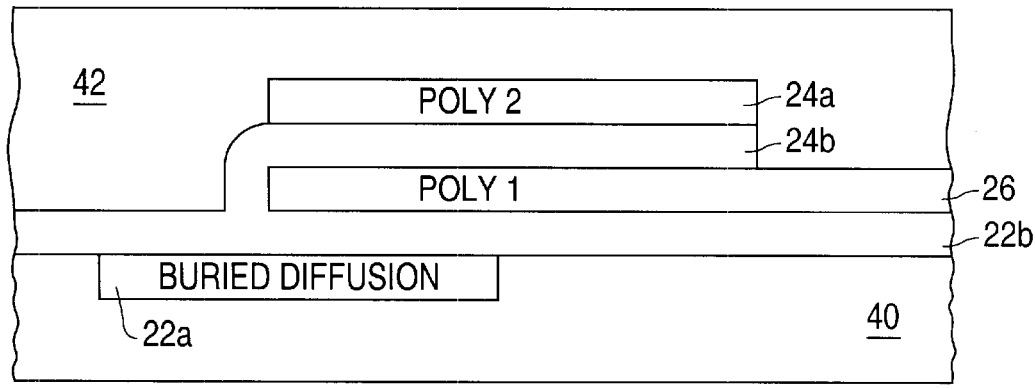
Figure 5F:
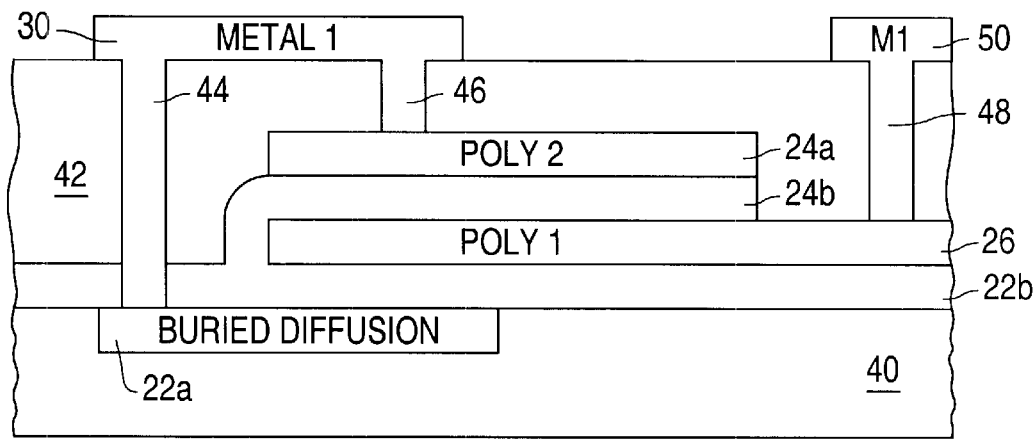
Figure 5G:
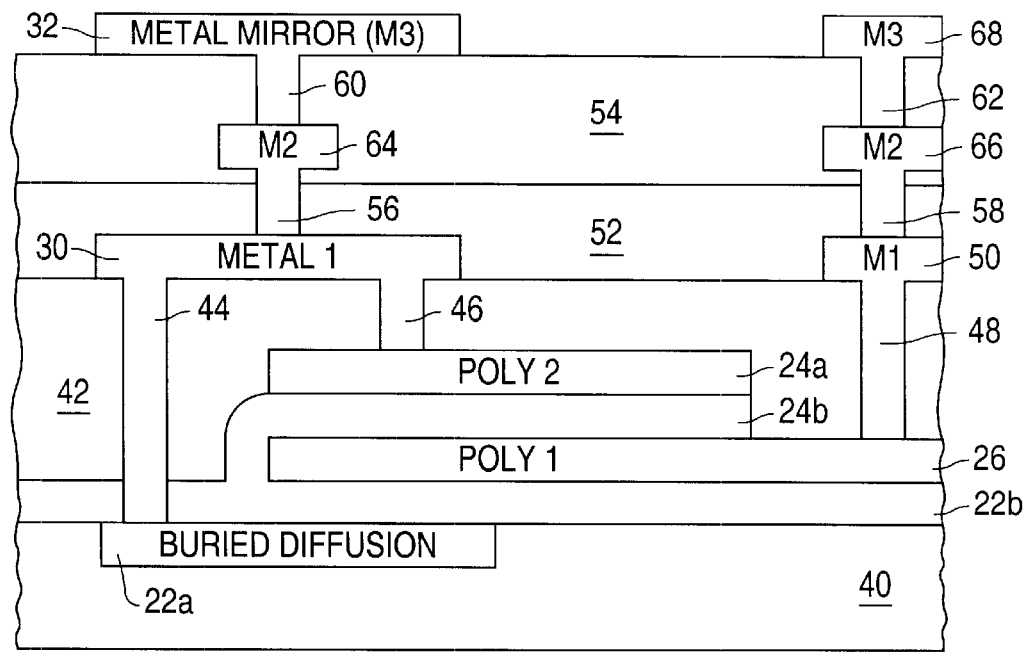

The next step is to deposit a layer of material 42 to insulate the diffusion and poly layers from each other (FIG. 5E). This material 42 can be any one of various insulating materials that are well known in the art, such as BPTS (borophosphorous silicate glass) or BPTEOS (borophosphorous tetraethylorthosilicate) glass. Following that, a layer of metalization ("metal1") is formed with two contacts 44, 46 for connecting to the diffusion region 22a and poly 2 layer 24a, thereby creating a conduction path 30 between the diffusion region 22a and poly2 layer 24a as well as a contact 48 and metal 1 connection 50 for connecting to the poly 1 electrode 26 (FIG. 5F).

Figure 5H:
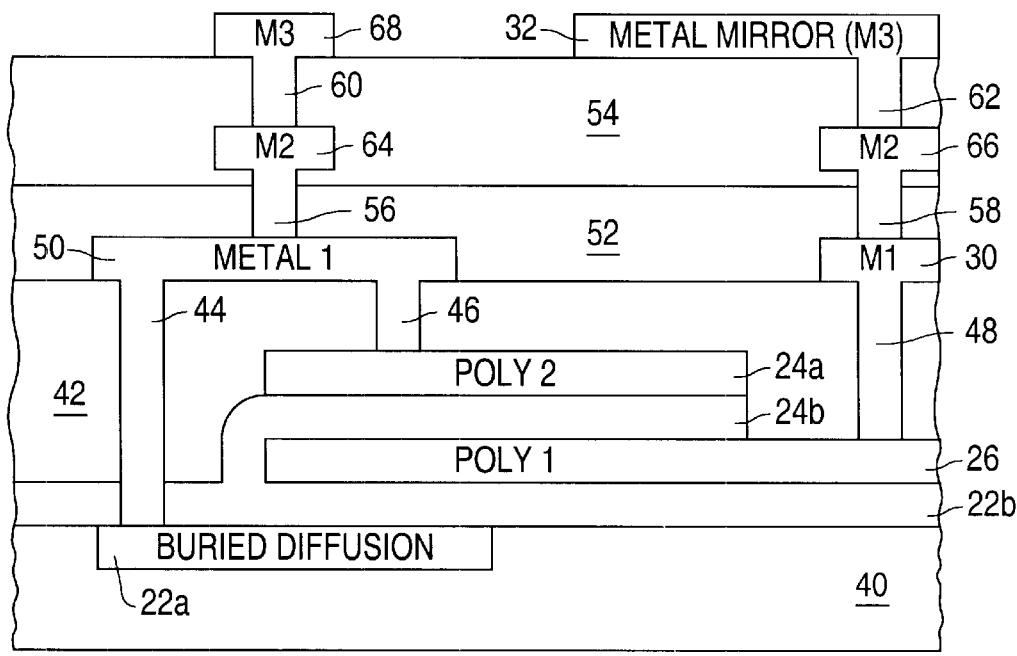

Next, further insulating material 52 is formed along with whatever other remaining circuit structures(s) 54 necessary to complete the pixel, including additional contacts 56, 58, 60, 62 needed to provide connections from the metal 1 connections 30, 50 to subsequent metal 2 connections 64, 66 and the metal mirror 32 and a metal 3 connection 68 for connecting to the reference voltage VREF (FIG. 3A). Also, with reference now to FIG. 5H, it should be understood that, in conformance with the capacitor configuration depicted in FIG. 3B, an alternative embodiment would have the metal mirror 32 connected to the shared electrode formed by poly 1 electrode 26 (via contacts 48, 58 and 62, metal 1 connection 30 and metal 2 connection 66), and the reference voltage VREF connected to the other electrodes 22a, 24a (via contacts 56 and 60, metal 1 connection 50, metal 2 connection 64 and metal 3 connection 68). It will be understood by one of ordinary skill in the art that the fabrication techniques and materials used in constructing the multiple storage capacitor circuit of FIGS. 3A and 3B are well known in the art, and many such conventional techniques an be used to form such structure.

In accordance with the foregoing discussion, it can be seen that this vertical, or stacked, configuration of capacitors 22, 24, with one capacitor 24 being a poly-to-poly capacitor, has little impact on the circuit surface area required for implementing the liquid crystal pixel circuit. Accordingly, the storage capacitance can be increased with little impact on circuit size. Such increased storage node capacitance will provide improved operating margin, as well as increased stability of the grey scale illumination for the pixel.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a liquid crystal on silicon (LCOS) display pixel with a plurality of storage capacitors, comprising:

an integrated circuit which includes a semiconductor substrate;

a charge terminal within said integrated circuit and that receives and conveys an electrical charge;

a reference terminal within said integrated circuit and that receives and conveys a reference voltage;

a pass transistor within said integrated circuit, coupled to said charge terminal, that responsive to reception of a control signal conducts said electrical charge;

a liquid crystal cell atop said integrated circuit coupled to said pass transistor and responsive to said electrical charge; and a plurality of storage capacitors within said integrated circuit, coupled in parallel between said pass transistor and said reference terminal, that receives and stores said electrical charge.

2. The apparatus of claim 1, wherein said pass transistor comprises a MOS transistor.

3. The apparatus of claim 1, wherein said plurality of storage capacitors comprises:

a first capacitor which includes
a first electrode,
a shared electrode, and
a first dielectric between said first and shared electrodes; and a second capacitor which includes
said shared electrode,
a second electrode, and
a second dielectric between said second and shared electrodes.

4. The apparatus of claim 3, wherein said first, second and shared electrodes are in a substantially stacked relationship within said integrated circuit.

5. The apparatus of claim 3, wherein:

said first electrode comprises semiconductor region within said semiconductor substrate;

said shared electrode comprises a first conductive layer within said integrated circuit; and said second electrode comprises a second conductive layer within said integrated circuit.

6. The apparatus of claim 5, wherein said first conductive layer is disposed between said semiconductor region and said second conductive layer.

7. The apparatus of claim 5, wherein said first electrode comprises a diffusion region within said semiconductor substrate.

8. The apparatus of claim 5, wherein said first and second conductive layers comprise first and second successive conductive layers within said integrated circuit.

9. An apparatus including a liquid crystal on silicon (LCOS) display pixel with a plurality of storage capacitors, comprising:

an integrated circuit which includes a semiconductor substrate;

a charge terminal within said integrated circuit that receives and conveys an electrical charge;

a reference terminal within said integrated circuit that receives and conveys a reference voltage;

a transistor within said integrated circuit, coupled to said charge terminal, that responsive to reception of a control signal conducts said electrical charge;

a liquid crystal cell atop said integrated circuit coupled to said pass transistor and responsive to said electrical charge;

a first capacitor within said integrated circuit, coupled between said pass transistor and said reference terminal, that receives and stores a portion of said electrical charge, wherein said first capacitor includes
a first electrode,
a shared electrode, and
a first dielectric material between said first and shared electrodes; and a second capacitor within said integrated circuit, coupled between said pass transistor and said reference terminal, that receives and stores another portion of said electrical charge, wherein said second capacitor includes
said shared electrode,
a second electrode, and
a second dielectric material between said second and shared electrodes.

10. The apparatus of claim 9, wherein:
said first electrode comprises a semiconductor region within said semiconductor substrate;
said second electrode comprises a first conductive layer within said integrated circuit; and
said shared electrode comprises a second conductive layer within said integrated circuit and disposed between said semiconductor region and said first conductive layer.

11. The apparatus of claim 10, wherein said first electrode comprises a diffusion region within said semicoconductor substrate.

12. The apparatus of claim 9, wherein:
said shared electrode is coupled to said reference terminal; and
said first and second electrodes are coupled to said pass transistor.

13. The apparatus of claim 9, wherein:
said shared electrode is coupled to said pass transistor; and
said first and second electrodes are coupled to said reference terminal.

14. A method of fabricating a liquid crystal on silicon (LCOS) display pixel with a plurality of storage capacitors, comprising the steps of:
providing a semiconductor substrate with an upper surface;
forming a transistor within said semiconductor substrate;
forming an isolated doped region within said semiconductor substrate below said upper surface;
forming a first conductive layer over said upper surface, wherein said first conductive layer is insulated from said isolated doped region;
forming a first insulating layer over said first conductive layer;
forming a second conductive layer over said first insulating layer, wherein said second conductive layer is insulated from said first conductive layer;
forming a second insulating layer over said second conductive layer;
forming a third conductive layer over said second insulating layer, wherein said third conductive layer is insulated from said second conductive layer;
forming a conduction path between said isolated doped region and said second conductive layer, wherein
said mutually insulated isolated doped region and first conductive layer together form a first capacitor,
said first conductive layer, said first insulating layer and said second conductive layer together form a second capacitor, and
said conduction path causes said first and second capacitors to be electrically coupled in parallel;
forming a liquid crystal cell; and
conductively coupling said liquid crystal cell, said transistor and said first and second capacitors.

15. The method of claim 14, wherein said step of forming a transistor within said semiconductor substrate comprises forming a MOS transistor.

16. The method of claim 14, wherein said step of forming an isolated doped region within said semiconductor substrate below said upper surface comprises forming a buried diffusion region within said semiconductor substrate.

17. The method of claim 14, wherein said step of forming a first conductive layer over said upper surface comprises forming a first layer of polysilicon.

18. The method of claim 17, wherein said step of forming a second conductive layer over said first insulating layer comprises forming a second layer of polysilicon.

19. The method of claim 14, wherein said step of forming a third conductive layer over said second insulating layer comprises forming a layer of metalization.

20. The method of claim 14, wherein said step of forming a conductive contact between said isolated doped region and said second conductive layer comprises:
forming a layer of metalization;
forming a first contact between said layer of metalization and said isolated doped region; and
forming a second contact between said layer of metalization and said second conductive layer.

21. The method of claim 14, wherein said step of conductively coupling said liquid crystal cell, said transistor and said first and second capacitors comprises conductively coupling said isolated doped region and said second conductive layer to said transistor.

22. The method of claim 14, wherein said step of conductively coupling said liquid crystal cell, said transistor an said first and second capacitors comprises conductively coupling said first conductive layer to said transistor.

* * * * *

UNITED STATES PATENT AND TRADEMARK OFFICE
CERTIFICATE OF CORRECTION

PATENT NO.     : 6,437,839 B1
DATED          : August 20, 2002
INVENTOR(S)    : Philip John Cacharelis It is certified that error appears in the above-identified patent and that said Letters Patent is hereby corrected as shown below:

Title page,
Item [56], References Cited, in the second cited reference, please delete the date "1/1993" and insert -- 11/1993 --, therefor.

Column 8,
Line 52, delete "an" and insert -- and --, therefor.

Signed and Sealed this

Twenty-eighth Day of January, 2003

JAMES E. ROGAN
*Director of the United States Patent and Trademark Office*